United States Patent
Bucht et al.

(10) Patent No.: US 11,472,417 B2
(45) Date of Patent: Oct. 18, 2022

(54) METHOD OF ADAPTING TUNING PARAMETER SETTINGS OF A SYSTEM FUNCTIONALITY FOR ROAD VEHICLE SPEED ADJUSTMENT CONTROL

(71) Applicant: ZENUITY AB, Gothenburg (SE)

(72) Inventors: Mattias Bucht, Lindome (SE); Tobias Karlsson, Gothenburg (SE)

(73) Assignee: ZENUITY AB, Gothenburg (SE)

( * ) Notice: Subject to any disclaimer, the term of this patent is extended or adjusted under 35 U.S.C. 154(b) by 226 days.

(21) Appl. No.: 16/891,530

(22) Filed: Jun. 3, 2020

(65) Prior Publication Data
US 2020/0385007 A1 Dec. 10, 2020

(30) Foreign Application Priority Data
Jun. 4, 2019 (EP) .................... 19178159

(51) Int. Cl.
*B60W 40/105* (2012.01)
*B60W 40/06* (2012.01)
*B60W 40/09* (2012.01)
*G06K 9/62* (2022.01)

(52) U.S. Cl.
CPC .......... *B60W 40/105* (2013.01); *B60W 40/06* (2013.01); *B60W 40/09* (2013.01); *G06K 9/6256* (2013.01); *B60W 2520/00* (2013.01); *B60W 2720/10* (2013.01)

(58) Field of Classification Search
CPC .... B60W 40/105; B60W 40/06; B60W 40/09; B60W 2520/00; B60W 2720/10; B60W 30/18145; B60W 30/143; B60W 2520/10; B60W 2520/105; B60W 2552/10; B60W 2552/15; B60W 2552/25; B60W 2552/30;
(Continued)

(56) References Cited

U.S. PATENT DOCUMENTS

| 10,994,741 B2 * | 5/2021 | Zhou .................. G06N 5/04 |
| 2009/0037062 A1 | 2/2009 | Lee et al. |
| 2011/0301802 A1 | 12/2011 | Rupp et al. |

(Continued)

FOREIGN PATENT DOCUMENTS

| DE | 102016011042 | 4/2017 |
| EP | 2527222 | 11/2012 |

*Primary Examiner* — Jason Holloway
(74) *Attorney, Agent, or Firm* — Duane Morris LLP; Gregory M Lefkowitz; Randall C. Pyles (57) ABSTRACT

A method of adapting tuning parameter settings of a system (2) functionality (3) for road vehicle (1) speed adjustment control starting from initially selected settings and applying a training set of speed adjustment profiles obtained from manually negotiated road segments and road segment data for these. For each of these road segments: —a simulated speed adjustment profile is calculated using the selected settings and the road segment data; —the manual and the simulated speed adjustment profiles are compared to obtain a residual; —a norm of the residual is calculated. For all of the road segments of the training set: —a norm of the norms of the residuals is calculated; —at least one of optimization, regression analysis or machine-learning is performed to minimize the norm of the norms of the residuals by selecting different settings and iterating the above steps. Settings rendering a minimal training set norm are selected.

13 Claims, 7 Drawing Sheets

(58) Field of Classification Search
CPC .. B60W 2555/20; G06K 9/6256; G06F 7/023; B60K 31/0066
See application file for complete search history.

(56) References Cited

U.S. PATENT DOCUMENTS

| | | |
|---|---|---|
| 2014/0244125 A1 | 8/2014 | Dorum et al. |
| 2014/0309837 A1 | 10/2014 | Ham |
| 2018/0174484 A1* | 6/2018 | Bradley ............ G08G 1/096775 |
| 2019/0156150 A1* | 5/2019 | Krishnan ............... G06V 20/46 |

* cited by examiner

METHOD OF ADAPTING TUNING PARAMETER SETTINGS OF A SYSTEM FUNCTIONALITY FOR ROAD VEHICLE SPEED ADJUSTMENT CONTROL

TECHNICAL FIELD

The present disclosure relates generally to curve speed adjustment for road vehicles and in particular a method of adapting tuning parameter settings of a system functionality for road vehicle speed adjustment control to find best settings starting from initially selected tuning parameter settings.

BACKGROUND

Driving at excessive speeds into a road curve could cause not only discomfort for vehicle occupants and safety issues due to potential loss of vehicle control, but also, excessive fuel consumption, possibly resulting in increased emissions.

Usually, a road vehicle driver relies on his or her visual information about the upcoming curve and possible speed limit and warning signs to determine the proper speed for negotiating that curve. However, the speed reduction required to negotiate a curve depends on many factors, such as the curvature of the road, the vehicle speed, the curve bank angle, the road gradient, the road surface coefficient of friction, vehicle characteristics, driver competence, etc.

In order to provide appropriate control of road vehicle speed for negotiating upcoming curves it has been suggested to either control against one point in the curve representing the steepest point and controls against that with a fixed deceleration in a proactive manner, or to have a yaw-rate based curve speed adaptation in a reactive manner.

However, both the above approaches to provide appropriate control of road vehicle speed for negotiating upcoming curves suffer from drawbacks and will not provide a natural and comfortable ride to vehicle passengers. Thus, there is a need for improving control of road vehicle speed for negotiating upcoming curves.

One attempt at addressing this issue is presented by US2015151753 A1, which discloses systems and methods that use cameras to provide autonomous navigation features. The system may include at least one image capture device configured to acquire a plurality of images of an area in a vicinity of the vehicle; a data interface; and at least one processing device. The at least one processing device may be configured to: receive the plurality of images via the data interface; recognize a curve to be navigated based on map data (e.g., GPS data) and vehicle position information; determine an initial target velocity for the vehicle based on at least one characteristic of the curve as reflected in the map data; adjust a velocity of the vehicle to the initial target velocity; determine, based on the plurality of images, one or more observed characteristics of the curve; determine an updated target velocity based on the one or more observed characteristics of the curve; and adjust the velocity of the vehicle to the updated target velocity. The system may detect the lane width, the curve radius, a degree of curvature, a rate of change in curvature, a degree of banking, a length or arc length of the curve, and the like. The system may determine the initial target velocity based on the presence of traffic lights before, during, or after a curve, weather conditions (e.g., light rain, heavy rain, windy, clear, etc.), road conditions (e.g., paved road, unpaved road, potholes, etc.), posted speed limits, the presence of vehicles or pedestrians nearby, etc.

Another attempt at addressing this issue, e.g. such as described by US2009037062 A1, discloses a system and method for detecting a road curve as a vehicle approaches the curve, automatically providing road curvature information and controlling vehicle speed. The system uses a locating device and a map database to know the vehicle's position. Depending on the speed of the vehicle, the system generates a curvature profile for different curvature data points at or around the curve in front of the vehicle. The system then generates a desired speed profile for the curvature points. The desired speed profile and the actual vehicle speed are compared to determine whether the vehicle is traveling too fast for the target speed at each profile point. The acceleration computation can be enhanced by providing a driver cornering mode input that the vehicle operator can select based on how aggressively the driver wants the system to act to slow down the vehicle.

Yet one additional attempt at addressing this issue is presented by EP2527222 A2, which discloses a method that involves controlling speed of a road vehicle depending on control data and providing curve data as the control data and as nearest curve data describing a drive curve during control of the road vehicle. The curve data is determined from road course data of a navigation device, and environment data is determined by a foresighted environment sensor. Comfort curve rate is determined by the consideration of the curve data. The comfort curve rate is determined from maximum curvature of a curve at a defined location and a predefined comfort lateral acceleration.

Still another attempt at addressing this issue, e.g. such as described by US2011301802 A1, discloses a target (not-to-exceed) speed for a vehicle over a road segment ahead of the vehicle is established based on a desired relationship with a speed profile of the segment. The speed profile is generated by analyzing a statistical distribution of historical speed data over the segment collected by probe vehicles. A driver alert is activated if the vehicle is likely to exceed the target speed based on at least one measured vehicle dynamic property. The target speed may be established by identifying a baseline road segment over which the vehicle has previously traveled and which is similar to the approaching road segment, comparing a past speed of the vehicle over the baseline segment with a speed profile of the baseline segment to determine a speed differential, and applying the speed differential to the speed profile of the approaching segment.

SUMMARY

An object of the present invention is to provide an improved method of adapting tuning parameter settings of a system functionality for road vehicle speed adjustment control to find best tuning parameter settings starting from initially selected tuning parameter settings.

According to a first aspect there is provided method of adapting tuning parameter settings of a system functionality for road vehicle speed adjustment control starting from initially selected tuning parameter settings, in order to arrive at adapted tuning parameters by learning from manual driving training data, the method comprising: applying to one or more data processing arrangements of the system a training set of manual driving training data consisting of speed adjustment profiles obtained from manually negotiated road segments and road segment data for these manually negotiated road segments; and for each of the manually negotiated road segments: —calculating a simulated speed adjustment profile using the selected tuning parameter settings and the road segment data; —comparing the manual and the simulated speed adjustment profiles to obtain a residual; —calculating a norm of the residual; and for all of the manually negotiated road segments of the training set: —calculating a norm of the norms of the residuals; —performing at least one of optimization, regression analysis or machine-learning to minimize the norm of the norms of the residuals by selecting different tuning parameter settings and iterating the above steps; and selecting, for the road vehicle speed adjustment control functionality, tuning parameter settings rendering a minimal training set norm. Through use of tuning parameter settings acquired by analyzing a training set of speed adjustment profiles obtained from manually negotiated road segments and road segment data for these manually negotiated road segments is enabled a more natural control feel.

In a further embodiment the method further comprises using a training set of speed adjustment profiles the road segments of which each are represented by a respective set of control points and which training set at least comprises de-facto velocities for the respective control points, and using road segment data comprising one or more of: road property data of roads comprising the respective road segments; environmental property data, vehicle property data and driver property data from the manual negotiations of the respective road segments.

In a yet further embodiment the method further comprises using a training set of speed adjustment profiles the road segments of which each are represented by a respective set of control points and which training set at least comprises data on distances to the respective control points and de-facto accelerations to reach the respective control points of the road segment from the distances to that control point, and using road segment data comprising one or more of: road property data of roads comprising the respective road segments; environmental property data, vehicle property data and driver property data from the manual negotiations of the respective road segments.

In a still further embodiment the method further comprises using a training set of speed adjustment profiles the road segments of which each are represented by a respective set of control points and which training set at least comprises data on distances, de-facto velocities for the respective control points and de-facto accelerations to reach the respective control points of the road segment from the distances to that control point, and using road segment data comprising one or more of: road property data of roads comprising the respective road segments; environmental property data, vehicle property data and driver property data from the manual negotiations of the respective road segments.

In an additional embodiment the method further comprises calculating the simulated speed adjustment profile from the road segment data through performing, using the selected tuning parameter settings, a translation to target velocities for the respective control points of the road segment and comparing these target velocities with de-facto velocities for the respective control points of the road segment provided by the training set speed adjustment profile to obtain the residual.

In yet an additional embodiment the method further comprises calculating the simulated speed adjustment profile from the road segment data through performing, using the selected tuning parameter settings, a translation to target accelerations to reach the respective control points of the road segment from distances to that control point and comparing these target accelerations with de-facto accelerations to reach the respective control points of the road segment from distances to that control point provided by the training set speed adjustment profile to obtain the residual.

In a still further embodiment, the method further comprises using road property data that include at least one of: curvature, road width; slope; inclination; lane width; road type; banking; road edge and number of lanes.

In a yet further embodiment the method further comprises using environmental property data including at least one of data on: sight distance; light conditions; lateral clearance distance; temperature; friction and weather conditions.

In yet an additional embodiment the method further comprises using driver property data including at least one of data on: individual preferences; and driving style.

In a still further embodiment the method further comprises using vehicle property data including at least one of data on: driver seat height over road; vehicle dynamic properties; vehicle suspension properties; power train properties.

According to a second aspect there is provided a road vehicle system comprising a functionality for speed adjustment control in accordance with the above method.

According to a further aspect there is provided a road vehicle comprising a system having a functionality for speed adjustment control in accordance with the above method.

According to a still further aspect there is provided a computer program embodied on a non-transitory computer-readable storage medium, the computer program comprising program code for controlling a process to execute a process for road vehicle speed adjustment control, the process comprising the above method.

According to a yet further aspect there is provided a computer program comprising instructions that when executed by a processing circuit is configured to cause the road vehicle system to perform the method According to an additional embodiment there is provided a carrier comprising the above computer program, wherein the carrier is one of an electronic signal, optical signal, radio signal or computer readable storage medium.

The above embodiments have the beneficial effects of allowing a system functionality for road vehicle speed adjustment control to learn the best tuning parameter settings for providing a natural control feel starting from initially selected tuning parameter settings.

BRIEF DESCRIPTION OF DRAWINGS

In the following, embodiments herein will be described in greater detail by way of example only with reference to attached drawings, in which.

DESCRIPTION OF EMBODIMENTS

In the following will be described some example embodiments of a method of adapting tuning parameter settings of a system functionality for road vehicle 1 speed adjustment control, a road vehicle system comprising a functionality for speed adjustment control in accordance with the method and a road vehicle comprising such a system as well as computer program for causing such a system to perform the method.

The road vehicle system comprising a functionality for speed adjustment control in accordance with the method may be and Advanced Driver Assistance System (ADAS), such as an adaptive cruise-control system or similar.

In accordance with the proposed method adaptation of the tuning parameter settings of the system functionality for road vehicle speed adjustment control starts from initially selected tuning parameter settings in order to arrive at adapted tuning parameters by learning from manual driving training data.

A training set of manual driving training data consisting of speed adjustment profiles obtained from manually negotiated road segments and road segment data for these manually negotiated road segments is applied to one or more data processing arrangements 9 of the system 2.

For each of the manually negotiated road segments: a simulated speed adjustment profile is calculated, using the selected tuning parameter settings and the road segment data; the manual and the simulated speed adjustment profiles are compared to obtain a residual; a norm of the residual is calculated.

For all of the manually negotiated road segments of the training set: a norm of the norms of the residuals is calculated; at least one of optimization, regression analysis or machine-learning is performed to minimize the norm of the norms of the residuals by selecting different tuning parameter settings and iterating the above steps.

Adapted tuning parameter settings rendering a minimal training set norm are selected for the road vehicle speed adjustment control functionality.

Some alternative of training sets of de-facto velocities $v_{df,n}$, $v_{df,n+1}$, etc. and/or de-facto accelerations $a_{df,n}$, $a_{df,n+1}$, etc. as well as sets of target velocities $v_{road,n}$, $v_{road,n+1}$, etc. and target accelerations $a_n$, $a_{n+1}$, etc. are illustrated in FIGS. 1 to 5. A road vehicle, designated E is also schematically included for reference in these figures.

Figure 1:
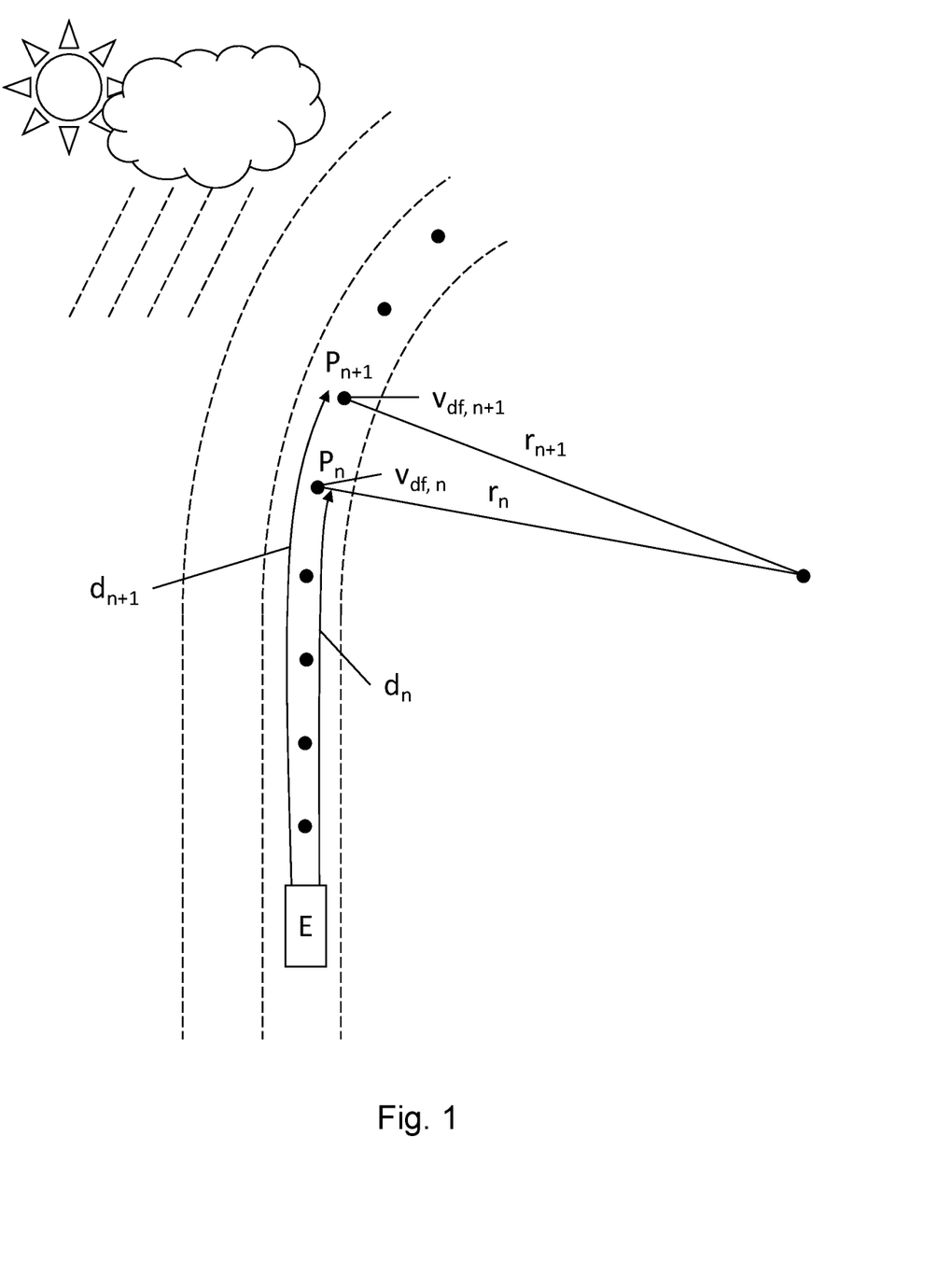
FIG. 1 illustrates schematically a first alternative training set according to embodiments herein.

As a first alternative, a training set of speed adjustment profiles can be used the road segments of which each are represented by a respective set of control points $P_n$, $P_{n+1}$, etc., as illustrated in FIG. 1. Such a training set should at least comprise de-facto velocities $v_{df,n}$, $v_{df,n+1}$, etc. for the respective control points $P_n$, $P_{n+1}$, etc., and road segment data comprising one or more of: road property data of roads comprising the respective road segments; environmental property data, vehicle property data and driver property data from the manual negotiations of the respective road segments.

Figure 2:
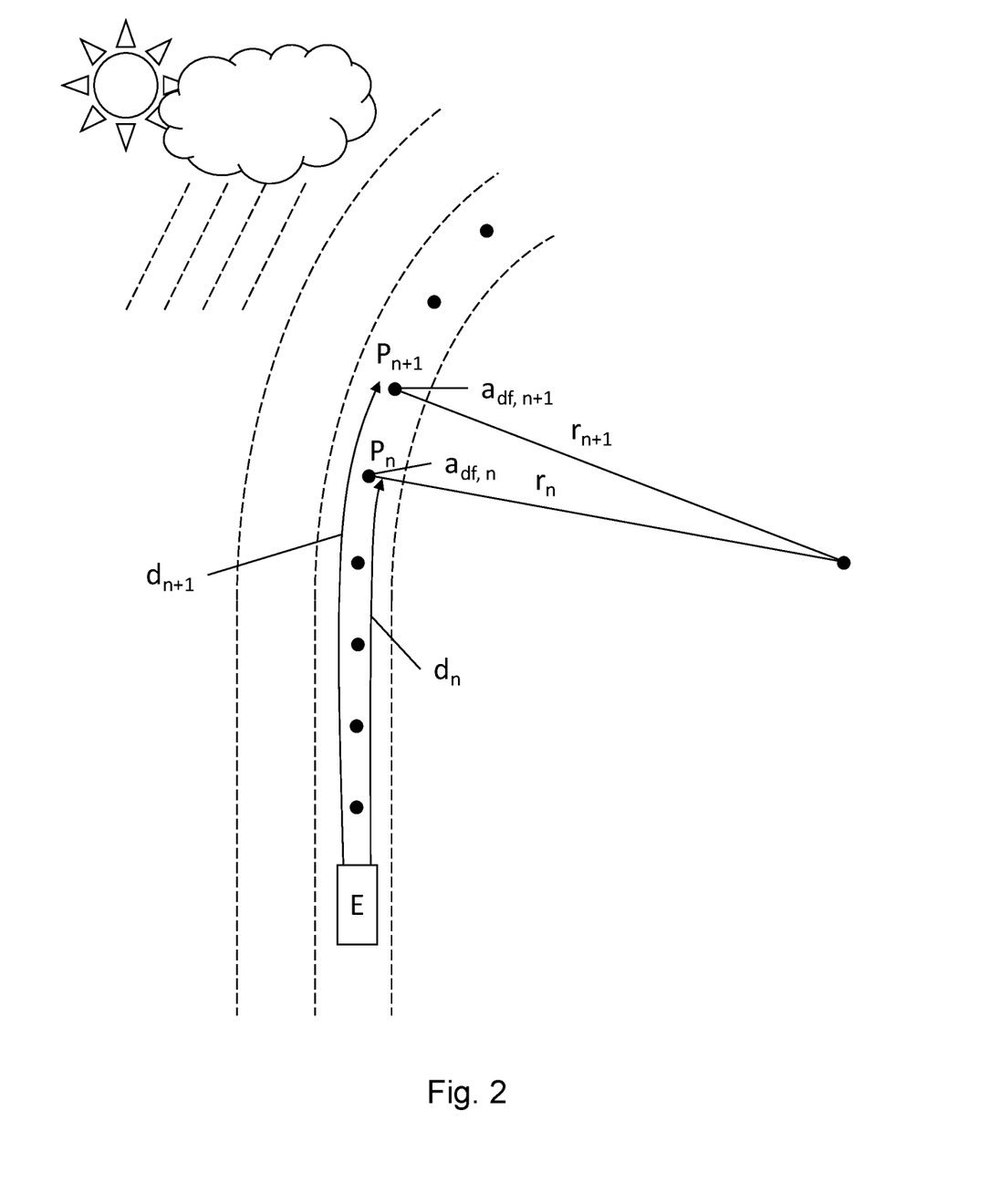
FIG. 2 illustrates schematically a second alternative training set according to embodiments herein.

As a second alternative, as illustrated in FIG. 2, a training set of speed adjustment profiles can be used the road segments of which each are represented by a respective set of control points $P_n$, $P_{n+1}$, etc., which training set at least comprises data on distances $d_n$, $d_{n+1}$, etc. to the respective control points $P_n$, $P_{n+1}$, etc. and de-facto accelerations $a_{df,n}$, $a_{df,n+1}$, etc. to reach the respective control points $P_n$, $P_{n+1}$, etc. of the road segment from the distances $d_n$, $d_{n+1}$, etc. to that control point ($P_n$, $P_{n+1}$, etc., and road segment data comprising one or more of: road property data of roads comprising the respective road segments; environmental property data, vehicle property data and driver property data from the manual negotiations of the respective road segments.

Figure 3:
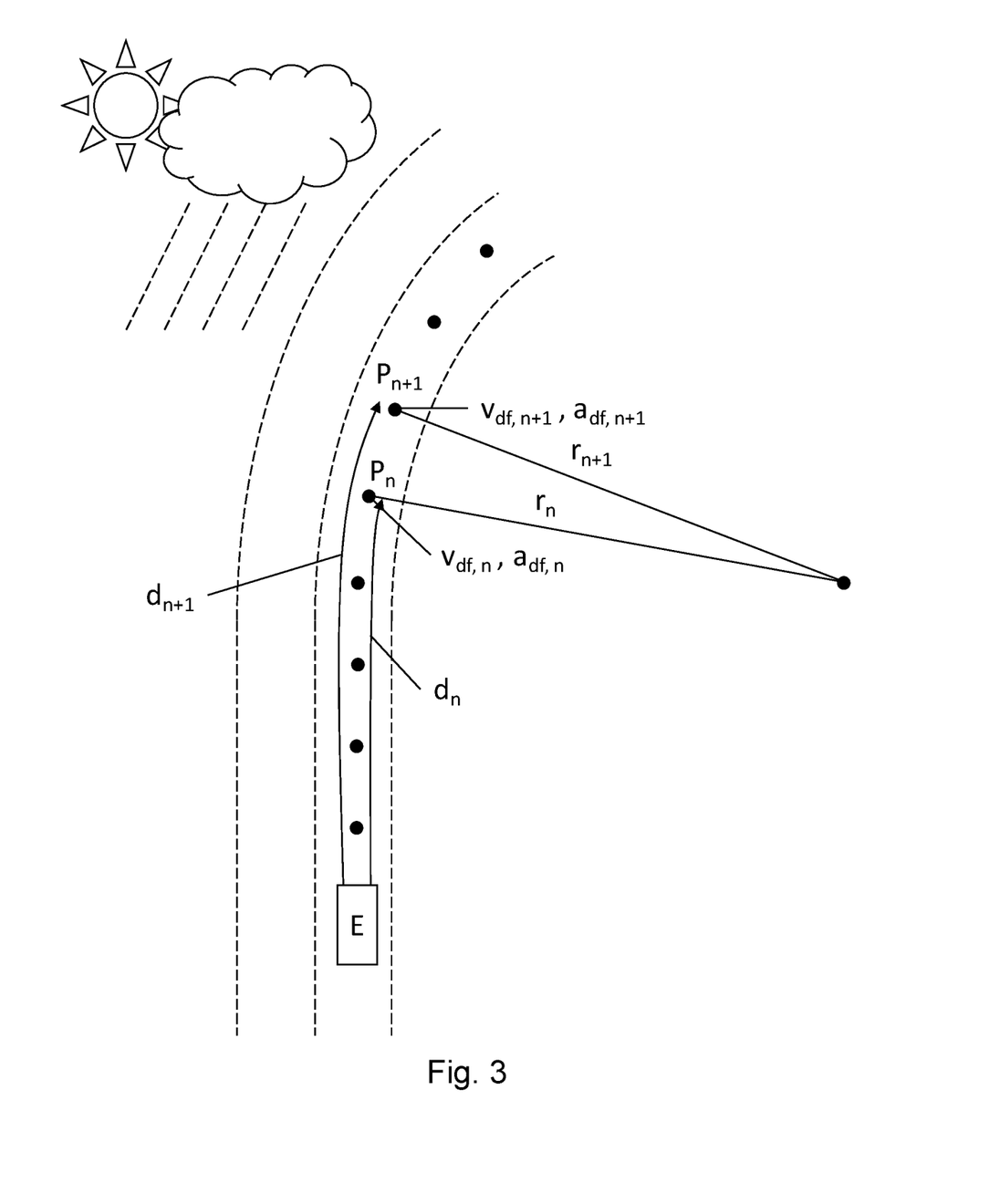
FIG. 3 illustrates schematically a third alternative training set according to embodiments herein.

As a third alternative, as illustrated in FIG. 3, a training set of speed adjustment profiles can be used the road segments of which each are represented by a respective set of control points $P_n$, $P_{n+1}$, etc., which training set at least comprises data on distances $d_n$, $d_{n+1}$, etc., de-facto velocities $v_{df,n}$, $v_{df,n+1}$, etc. for the respective control points $P_n$, $P_{n+1}$, etc. and de-facto accelerations $a_{df,n}$, $a_{df,n+1}$, etc. to reach the respective control points $P_n$, $P_{n+1}$, etc. of the road segment from the distances $d_n$, $d_{n+1}$, etc. to that control point $P_n$, $P_{n+1}$, etc., and road segment data comprising one or more of: road property data of roads comprising the respective road segments; environmental property data, vehicle property data and driver property data from the manual negotiations of the respective road segments.

Figure 4:
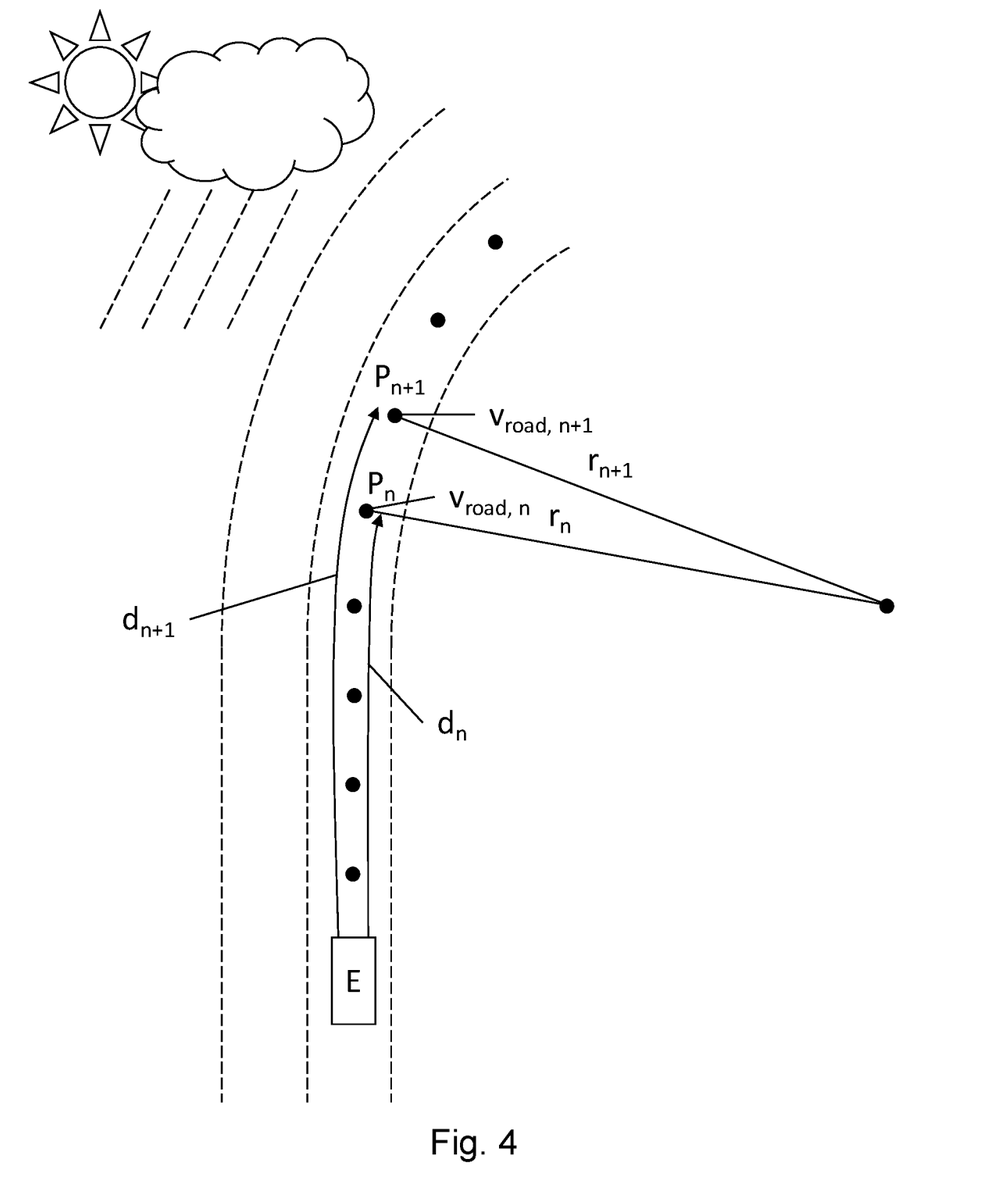
FIG. 4 illustrates schematically a set of target velocities according to embodiments herein.

The simulated speed adjustment profile can, to obtain the residual, for the first and third alternatives above, be calculated from the road segment data through performing, using the selected tuning parameter settings, a translation to target velocities $v_{road,n}$, $v_{road,n+1}$, etc. for the respective control points $P_n$, $P_{n+1}$, etc. of the road segment, as illustrated in FIG. 4, and comparing these target velocities $v_{road,n}$, $v_{road,n+1}$, etc. with de-facto velocities $v_{df,n}$, $v_{df,n+1}$, etc., as illustrated in FIG. 1, for the respective control points $P_n$, $P_{n+1}$, etc. of the road segment provided by the training set speed adjustment profile.

Figure 5:
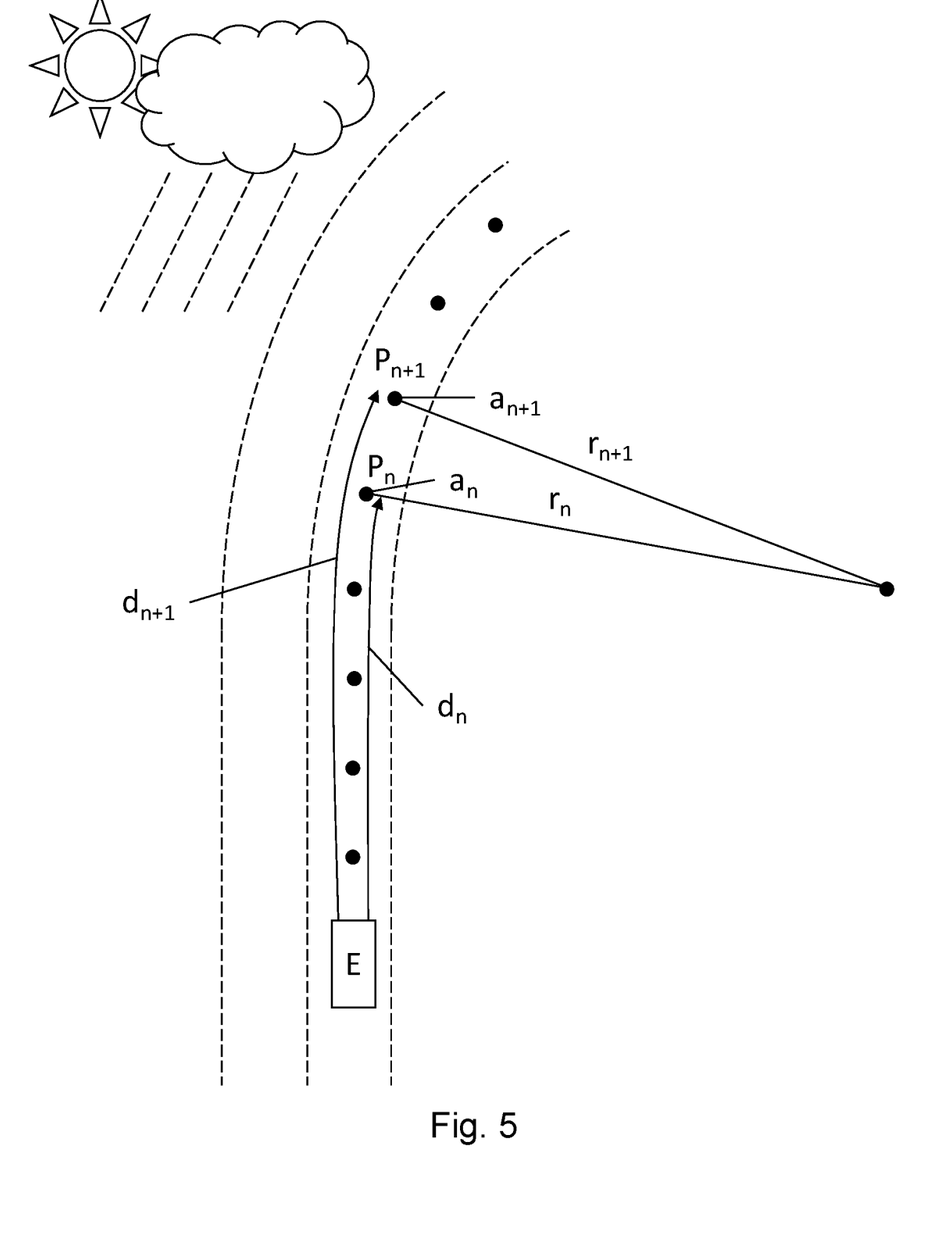
FIG. 5 illustrates schematically a set of target accelerations according to embodiments herein.

The simulated speed adjustment profile can, to obtain the residual, for the second and third alternatives above, be calculated from the road segment data through performing, using the selected tuning parameter settings, a translation to target accelerations $a_n$, $a_{n+1}$, etc. to reach the respective control points $P_n$, $P_{n+1}$, etc. of the road segment, as illustrated in FIG. 5, from distances $d_n$, $d_{n+1}$, etc. to that control point $P_n$, $P_{n+1}$, etc. and comparing these target accelerations $a_n$, $a_{n+1}$, etc. with de-facto accelerations $a_{df,n}$, $a_{df,n+1}$, etc., as illustrated in FIG. 2, to reach the respective control points $P_n$, $P_{n+1}$, etc. of the road segment from distances $d_n$, $d_{n+1}$, etc. to that control point $P_n$, $P_{n+1}$, etc. provided by the training set speed adjustment profile.

Road property data can be used that include at least one of: curvature, road width; slope; inclination; lane width; road type; banking; road edge and number of lanes, $I_n$, $I_{n+1}$ etc. Such road property data may have been obtained by one or more road vehicles during the manual negotiation of the road segments using onboard camera systems, map systems, lidar systems, radar systems and combinations of such systems, e.g. through sensor fusion.

Curvature data may have been obtained during the manual negotiation of the road segments from one or more of: a map system, such as a satellite based global positioning system (GPS); an onboard camera system, such as a forward-facing front view camera; one or more onboard yaw-rate sensors, i.e. gyroscopic devices that measure the vehicle's angular velocity around its vertical axis. Map systems, such as GPS-systems provide long range data with low resolution. Onboard camera sensors provide medium range data with medium resolution. Yaw-rate sensors provide current state data, i.e. zero-range data with high resolution.

Environmental property data can be used that include at least one of data on: sight distance; light conditions; lateral clearance distance; temperature; friction and weather conditions, e.g. rain, fog, etc. Such environmental property data of the road vehicle environ may have been obtained by one or more road vehicles during the manual negotiation of the road segments from onboard vehicle sensors, e.g. using camera sensors, temperature sensors and hygrometers, as well as from online weather services, e.g. trough wireless reception of environmental property data from online weather services.

Driver property data can be used that include at least one of data on: individual preferences; and driving style, e.g. as manifested in driving profiles used during the manual negotiation of the road segments, such as ECO-, dynamic-, comfort-, sport-driving profiles etc.; and sensor determined driving style of a driver, e.g. over- and under-steering, etc. ECO-tuning is usually similar to but "opposite" to a dynamic mode.

Vehicle property data can be used that include at least one of data on: driver seat height over road; vehicle dynamic properties; vehicle suspension properties; and power train properties.

Optimization can be performed by at least one of partial- or exhaustive grid search, line search, a gradient descent method, a Gauss-Newton method, a Levenberg-Marquardt algorithm, or similar.

Machine-learning can e.g. be performed by supervised learning, using an algorithm that builds a mathematical model from the training set of data that contains both the driver/vehicle inputs from the manual negotiation of the road segments and the desired outputs, i.e. the associated speed adjustment profiles.

Regression analysis can be performed using regression algorithms, which can be seen as types of supervised learning algorithms providing continuous outputs.

Thus, the optimization, regression or machine learning algorithms tries to minimize the complete training set norm, i.e. the aggregate of road segment norms by changing the tuning parameters to find the best setting tuning parameters.

It is possible to use tuning parameter settings that comprises at least one of a polynomial or table lookup function for mapping system inputs to system outputs, controller acceleration, controller acceleration gain scheduling, acceleration hold times between curves, or similar.

The maximum and/or minimum acceleration can be constrained in the optimization, regression and machine learning to achieve compliance with any of vehicle acceleration physical limits, legal requirements and safety requirements.

Figure 6:
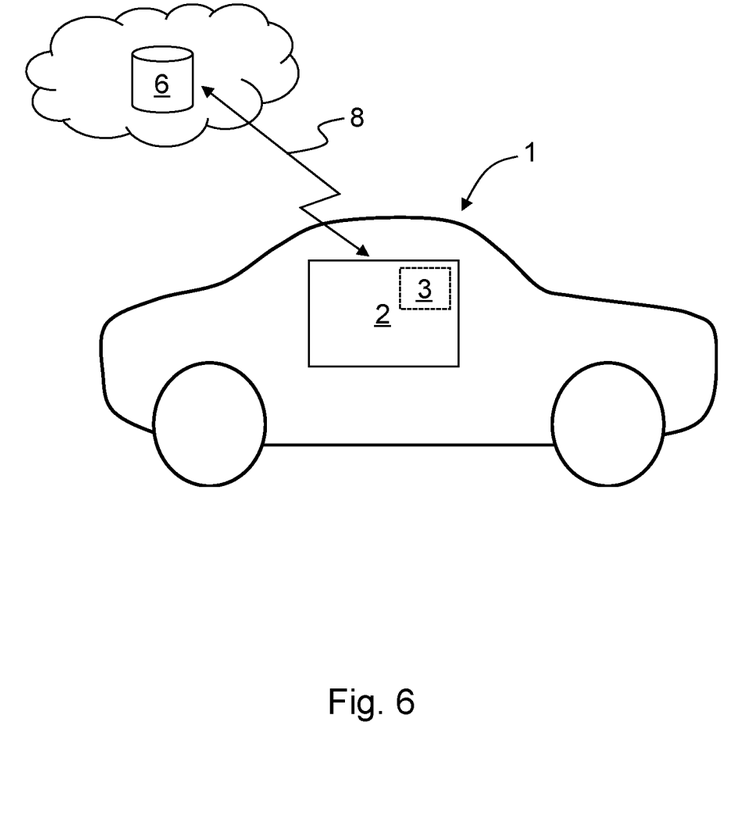
FIG. 6 illustrates schematically a road vehicle comprising a system having a functionality for speed adjustment control according to embodiments herein.

As illustrated in FIG. 6, it is further envisaged a road vehicle system 2 comprising a functionality 3 for speed adjustment control in accordance with the herein described method and a road vehicle 1 comprising such a system 2.

Furthermore, here envisaged is a computer program 4 embodied on a non-transitory computer-readable storage medium, the computer program 4 comprising program code for controlling a process to execute a process for road vehicle 1 speed adjustment control, the process comprising the herein described method.

Figure 7:
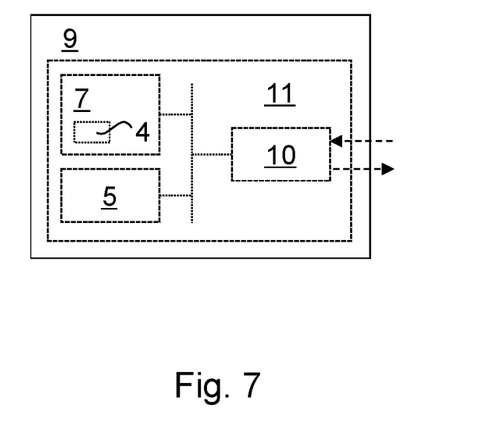
FIG. 7 illustrates schematically a processing arrangement including a processing module with a processing circuit according to embodiments herein.

A such computer program 4 can comprise instructions that when executed by a processing circuit 5, as illustrated in FIG. 7, is configured to cause the road vehicle system 2 to perform the method. The processing circuit 5 may comprise a set of one or more processors (not shown). A carrier may comprise the computer program 4, where the carrier may be one of an electronic signal, optical signal, radio signal or computer readable storage medium.

The processing circuit 5 may be arranged in the road vehicle 1 system 2 or at a location remote from the road vehicle 1, e.g. a remote server 6, as illustrated in FIG. 6.

In embodiments where the processing circuit 5 is arranged at a remote server 6 the method may be implemented through continuously streaming data between the processing circuit 5 and the road vehicle 1. Streaming is the delivery of content in real-time, as events happen, i.e. transferring a continuous stream of data. Continuous streaming of the obtained data allows a system functionality 3 for road vehicle 1 speed adjustment control to continuously train a current control algorithm through adaptation of the tuning parameter settings.

The system 2 or the remote server 6 may comprise one or more data processing arrangements 9, each including a processing module 11 generally including at least one processing circuit 5 comprising one or more processors and including at least one memory 7, the memory storing instructions, e.g. the computer program 4 (software), executable by the processor, including instructions for carrying out the various steps and processes described herein. It usually also comprises an I/O module 10, providing for input of data to be processed and output of the results of such processing.

Streaming of data between the road vehicle 1 and the processing circuit 5 located at such a remote server 6 (cloud) and back to a road vehicle system 2 comprising the functionality 3 for speed adjustment control of the road vehicle 1 may further include a communication network, e.g. as illustrated by arrow 8, connected to the remote server 12. Such a communication network 8 represents one or more mechanisms by which a road vehicle 1 may communicate with the remote server 6. Accordingly, the communication network 8 may be one or more of various wireless communication mechanisms, including any desired combination of wireless, e.g., radio frequency, cellular, satellite, and microwave communication mechanisms and any desired network topology. Exemplary communication networks include wireless communication networks, e.g., using Bluetooth, IEEE 802.11, LTE, 5G, etc.

Combination of all above mentioned factors contribute to finding the best parameter settings for a system functionality 3 for road vehicle 1 speed adjustment control to ensure smooth and safe negotiation of road curves.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of adapting tuning parameter settings of a system functionality for road vehicle speed adjustment control starting from initially selected tuning parameter settings, in order to arrive at adapted tuning parameters by learning from manual driving training data, the method comprising:

applying, to one or more data processing arrangements of the system, a training set of manual driving training data consisting of speed adjustment profiles obtained from manually negotiated road segments and road segment data for these manually negotiated road segments;

for each of the manually negotiated road segments:
calculating a simulated speed adjustment profile using the selected tuning parameter settings and the road segment data;
comparing the manual and the simulated speed adjustment profiles to obtain a residual; and
calculating a norm of the residual;

for all of the manually negotiated road segments of the training set:
calculating a norm of the norms of the residuals; and
performing at least one of optimization, regression analysis or machine-learning to minimize the norm of the norms of the residuals by selecting different tuning parameter settings and iterating the above steps;
selecting tuning parameter settings rendering a minimal training set norm;
applying the selected tuning parameter settings to the road vehicle speed adjustment control functionality; and
applying, by the road vehicle speed adjustment control functionality, speed control to the road vehicle.

2. The method according to claim 1, wherein it further comprises using a training set of speed adjustment profiles, the road segments of which each are represented by a respective set of control points and which training set at least comprises de-facto velocities for the respective control points, and using road segment data comprising one or more of: road property data of roads comprising the respective road segments, environmental property data, vehicle property data, and driver property data from the manual negotiations of the respective road segments.

3. The method according to claim 1, wherein it further comprises using a training set of speed adjustment profiles, the road segments of which each are represented by a respective set of control points and which training set at least comprises data on distances to the respective control points and de-facto accelerations to reach the respective control points of the road segment from the distances to that control point, and using road segment data comprising one or more of: road property data of roads comprising the respective road segments, environmental property data, vehicle property data, and driver property data from the manual negotiations of the respective road segments.

4. The method according to claim 1, wherein it further comprises using a training set of speed adjustment profiles, the road segments of which each are represented by a respective set of control points and which training set at least comprises data on distances, de-facto velocities for the respective control points and de-facto accelerations to reach the respective control points of the road segment from the distances to that control point, and using road segment data comprising one or more of: road property data of roads comprising the respective road segments, environmental property data, vehicle property data, and driver property data from the manual negotiations of the respective road segments.

5. The method according to claim 2, wherein it further comprises calculating the simulated speed adjustment profile from the road segment data through performing, using the selected tuning parameter settings, a translation to target velocities for the respective control points of the road segment and comparing these target velocities with de-facto velocities for the respective control points of the road segment provided by the training set speed adjustment profile to obtain the residual.

6. The method according to claim 3, wherein it further comprises calculating the simulated speed adjustment profile from the road segment data through performing, using the selected tuning parameter settings, a translation to target accelerations to reach the respective control points of the road segment from distances to that control point and comparing these target accelerations with de-facto accelerations to reach the respective control points of the road segment from distances to that control point provided by the training set speed adjustment profile to obtain the residual.

7. The method according to claim 2, wherein it further comprises using road property data that include at least one of: curvature; road width; slope; inclination; lane width; road type; banking; road edge; and number of lanes.

8. The method according to claim 2, wherein it further comprises using environmental property data including at least one of data on: sight distance; light conditions; lateral clearance distance; temperature; friction; and weather conditions.

9. The method according to claim 2, wherein it further comprises using driver property data including at least one of data on: individual preferences; and driving style.

10. The method according to claim 2, wherein it further comprises using vehicle property data including at least one of data on: driver seat height over road; vehicle dynamic properties; vehicle suspension properties; and power train properties.

11. A system comprising a system functionality for road vehicle speed adjustment control
where adapting of tuning parameter settings of the system functionality for road vehicle speed adjustment control is arranged to start from initially selected tuning parameter settings, in order to arrive at adapted tuning parameters by learning from manual driving training data, through: applying to one or more data processing arrangements of the system a training set of manual driving training data consisting of speed adjustment profiles obtained from manually negotiated road segments and road segment data for these manually negotiated road segments; and for each of the manually negotiated road segments:
calculating a simulated speed adjustment profile using the selected tuning parameter settings and the road segment data;
comparing the manual and the simulated speed adjustment profiles to obtain a residual;
calculating a norm of the residual; and for all of the manually negotiated road segments of the training set:
calculating a norm of the norms of the residuals;
performing at least one of optimization, regression analysis or machine-learning to minimize the norm of the norms of the residuals by selecting different tuning parameter settings and iterating the above steps; and
selecting tuning parameter settings rendering a minimal training set norm, and applying the selected tuning parameter settings to the road vehicle speed adjustment control functionality, and applying, by the road vehicle speed adjustment control functionality, speed control to the road vehicle.

12. A road vehicle comprising a system having a functionality for speed adjustment control
where adapting of tuning parameter settings of the system functionality for road vehicle speed adjustment control is arranged to start from initially selected tuning parameter settings, in order to arrive at adapted tuning parameters by learning from manual driving training data, through: applying to one or more data processing arrangements of the system a training set of manual driving training data consisting of speed adjustment profiles obtained from manually negotiated road segments and road segment data for these manually negotiated road segments; and for each of the manually negotiated road segments:
calculating a simulated speed adjustment profile using the selected tuning parameter settings and the road segment data;
comparing the manual and the simulated speed adjustment profiles to obtain a residual;
calculating a norm of the residual; and for all of the manually negotiated road segments of the training set:
calculating a norm of the norms of the residuals;
performing at least one of optimization, regression analysis or machine-learning to minimize the norm of the norms of the residuals by selecting different tuning parameter settings and iterating the above steps; and
selecting tuning parameter settings rendering a minimal training set norm, and applying the selected tuning parameter settings to the road vehicle speed adjustment control functionality, and applying, by the road vehicle speed adjustment control functionality, speed control to the road vehicle.

13. A non-transitory computer-readable medium including executable instructions that when executed by a processor in the system of claim 11 to cause the processor to perform the steps of:
adapting tuning of parameter settings of the system functionality for road vehicle speed adjustment control starting from initially selected tuning parameter settings, in order to arrive at adapted tuning parameters by learning from manual driving training data, in accordance with a method comprising: applying to one or more data processing arrangements of the system a training set of manual driving training data consisting of speed adjustment profiles obtained from manually negotiated road segments and road segment data for these manually negotiated road segments; and for each of the manually negotiated road segments:
calculating a simulated speed adjustment profile using the selected tuning parameter settings and the road segment data;
comparing the manual and the simulated speed adjustment profiles to obtain a residual;
calculating a norm of the residual; and for all of the manually negotiated road segments of the training set:
calculating a norm of the norms of the residuals;
performing at least one of optimization, regression analysis or machine-learning to minimize the norm of the norms of the residuals by selecting different tuning parameter settings and iterating the above steps; and
selecting tuning parameter settings rendering a minimal training set norm, and applying the selected tuning parameter settings to the road vehicle speed adjustment control functionality, and applying, by the road vehicle speed adjustment control functionality, speed control to the road vehicle.

* * * * *